United States Patent
Barbier

(12) 
(10) Patent No.: US 12,118,146 B2
(45) Date of Patent: *Oct. 15, 2024

(54) METHOD, DEVICE, AND SYSTEM OF MEASURING EYE CONVERGENCE ANGLE

(71) Applicant: STMICROELECTRONICS, INC., Coppell, TX (US)

(72) Inventor: Dominique Paul Barbier, Scotts Valley, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,912

(22) Filed: Jun. 22, 2023

(65) Prior Publication Data

US 2023/0333648 A1 Oct. 19, 2023

Related U.S. Application Data

(63) Continuation of application No. 16/727,795, filed on Dec. 26, 2019, now Pat. No. 11,720,170.

(51) Int. Cl.
  *G06F 3/01* (2006.01)
  *G01C 3/06* (2006.01)
  (Continued)

(52) U.S. Cl.
  CPC .............. *G06F 3/013* (2013.01); *G01C 3/06* (2013.01); *G01C 3/14* (2013.01); *G01C 3/22* (2013.01); *G02C 7/04* (2013.01); *G02C 2200/02* (2013.01)

(58) Field of Classification Search
  CPC ... G06F 3/013; G06F 3/0346; G02B 27/0093; G02B 27/0172; G02C 7/04; G01C 3/14; G01C 3/06; G01C 3/22
  See application file for complete search history.

(56) References Cited

U.S. PATENT DOCUMENTS

| | | |
|---|---|---|
| 5,583,795 A | 12/1996 | Smyth |
| 7,126,330 B2 | 10/2006 | Peczalski et al. |

(Continued)

FOREIGN PATENT DOCUMENTS

| | | |
|---|---|---|
| CN | 108156441 A | 6/2018 |
| JP | 2004006752 A | 1/2004 |

OTHER PUBLICATIONS

"Geomagnetism: Frequently Asked Questions", National Centers for Environmental Information, National Oceanic and Atmospheric Administration, https://www.ngdc.noaa.gov/geomag/faqgeom.shtml#What_is_the_Earths_magnetic_field, 12 pages.

(Continued)

*Primary Examiner* — Xuemei Zheng
(74) *Attorney, Agent, or Firm* — SEED IP LAW GROUP LLP

(57) ABSTRACT

An electronic device capable of determining an eye convergence angle using a magnetometer sensor is provided. The magnetometer sensor is capable of reporting angle readings in three dimensions that is aligned with an eye gaze direction of each eye of a user. The magnetometer which is incorporated into the device can fit into a human eye like a contact lens and determine the angle of the gaze direction of both eyes with respect to an object within a field of view. By obtaining this eye convergence angle for an object, it is possible to accurately detect depth information. The electronic device also functions as a digital contact lens that can automatically adjust the focal point of the object to provide the user with a clear vision. The electronic device also includes a display that provides the user with additional information about the object.

17 Claims, 10 Drawing Sheets

(51) Int. Cl.
*G01C 3/14* (2006.01)
*G01C 3/22* (2006.01)
*G02C 7/04* (2006.01)

(56) References Cited

U.S. PATENT DOCUMENTS

| | | | |
|---|---|---|---|
| 8,289,021 | B2 | 10/2012 | Vigna et al. |
| 8,632,182 | B2 | 1/2014 | Chen et al. |
| 10,353,219 | B1* | 7/2019 | Hannaford ............ H04N 13/366 |
| 10,444,541 | B2* | 10/2019 | Hyde ..................... G02C 7/081 |
| 10,534,045 | B2 | 1/2020 | Green et al. |
| 11,237,408 | B2 | 2/2022 | Rakhyani et al. |
| 11,543,655 | B1* | 1/2023 | Weber ................ G02B 27/0075 |
| 2006/0236923 | A1 | 10/2006 | Kouvetakis et al. |
| 2011/0301897 | A1 | 12/2011 | Weiss et al. |
| 2012/0007597 | A1 | 1/2012 | Seeger et al. |
| 2012/0013332 | A1 | 1/2012 | Honkura et al. |
| 2014/0240656 | A1 | 8/2014 | Pugh et al. |
| 2014/0266187 | A1 | 9/2014 | Mather |
| 2015/0285873 | A1 | 10/2015 | Cai et al. |
| 2015/0362755 | A1 | 12/2015 | Lee et al. |
| 2016/0133201 | A1* | 5/2016 | Border .................... G06F 18/00 345/694 |
| 2016/0299354 | A1 | 10/2016 | Shtukater |
| 2017/0345997 | A1 | 11/2017 | Ausserlechner |
| 2017/0371184 | A1 | 12/2017 | Shtukater |
| 2018/0275218 | A1 | 9/2018 | Umetsu |
| 2019/0353926 | A1 | 11/2019 | Toner et al. |
| 2020/0096786 | A1* | 3/2020 | Toner ........................ G02C 7/04 |
| 2021/0026444 | A1 | 1/2021 | Haine et al. |
| 2021/0311328 | A1* | 10/2021 | Mirjalili ................. G02C 7/049 |
| 2022/0350167 | A1* | 11/2022 | Bhat ....................... G02C 7/048 |

OTHER PUBLICATIONS

"Global market size forecast: mobile internet device 2010-2020", Statista Research Department, Dec. 2011, 2 pages.
Abderrahmane et al., "Robust Hall Effect Magnetic Field Sensors for Operation at High Temperatures and in Harsh Radiation Environments", IEEE Transactions on Magnetics, 48(11), 2012, pp. 4421-4423.
Alberts et al., "Nucleation and growth gallium arsenide on silicon", Journal of Materials Science, 29, 1994, pp. 2017-2024.
Bailey et al., "Chemical Etching and Organometallic Chemical Vapor Deposition on Varied Geometries of GaAs", Materials Science, N89-24728, 1989, pp. 250-263.
Bailey, "A V-Grooved GaAs Solar Cell", 20th Photovoltaic Specialists Conference, 1988, 9 pages.
Bajwa, "KOH etching of (100) Si wafer, No. 1", University of Pennsylvania Scholarly Commons, Protocols and Reports, Paper 18, 2016, 8 pages.
Chand et al., "GaAs on Silicon Grown by Molecular Beam Epitaxy: Progress and Applications for Selectively Doped Heterostructure Transistors", Materials Science and Engineering, B3, 1989, pp. 485-496.
Chu et al., "Nanoscale Growth of GaAs on Patterned Si(111) Substrates by Molecular Beam Epitaxy", Cryst. Growth Des., 14(2), 2014, pp. 593-598.
Erickson, "A Study of Anisotropic Chemical Etching on Crystalline Silicon", Physics Capstone Project, Paper 7, 2014, 4 pages.
Ghosh et al., "Impact of GaN buffer layer thickness on structural and optical properties of AlGaN/GaN based high electron mobility transistor structure grown on Si(111) substrate by plasma assisted molecular beam epitaxy technique", Proceedings of the 2015 Third International Conference on Computer, Communication, Control and Information Technology (C3IT), 2015, 4 pages.
Haned et al., "Nano-tesla magnetic field magnetometry using an InGaAs—AlGaAs—GaAs 2DEG Hall sensor", Sensors and Actuators, A 102, 2003, pp. 216-222.
Kelly et al., "Anisotropy in the wet-etching of semiconductors", Current Opinion in Solid State and Materials Science, 9, 2005, pp. 84-90.
Kim et al., "Influence of V-pits on the efficiency droop in InGaN/GaN quantum wells", Optical Society of America, 22(S3), 2014, 10 pages.
Kozawa et al., "Dislocation Etch Pits in GaN Epitaxial Layers Grown on Sapphire Substrates", J. Electrochem. Soc., 143(1), 1996, pp. L17-L19.
Long et al., "Growth and fabrication of semi-polar InGaN/GaN multi-quantum well light-emitting diodes on microstructured Si (001) substrates", Chinese Physics B, 24(11), 118102, 8 pages.
Mosser et al., "Low-cost 2DEG magnetic sensor with metrological performances for magnetic field and current sensing", 1997 International Conference on solid-State Sensors and Actuators, 1997, pp. 401-404.
Nguyen van Dau et al., "Magnetic sensors for nanotesla detection using planar Hall effect", Sensors and Actuators, A53, 1996, pp. 256-260.
Nifa et al., "Characterization of 2DEG in AlGaN/GaN heterostructure by Hall effect", Microelectronic Engineering, 178, 2017, pp. 128-131.
Roumenin, "Handbook of Sensors and Actuators: Solid State Magnetic Sensors", Chapter 4, Elsevier Science, vol. 2, 1984.
Schäpers et al., "Reflection and Transmission of Ballistic Electrons at a Potential Barrier", Superlattices and Microstructures, 14(1), 1993, pp. 57-63.
Todaro et al., "A fully integrated GaAs-based three-axis Hall magnetic sensor exploiting self-positioned strain released structures", Journal of Micromechanics and Microengineering, vol. 20, 2010, 6 pages.
Tsai et al., "Understanding and Predicting GaN Anisotropic Wet Etch Facet Evolution", Electronic Materials Conference, Jun. 23, 2016, 26 pages.
Tumanski, "Induction coil sensors—A review", Measurement Science and Technology, 18(3), 2007, pp. R31-R46.
Yang et al., "GaN-on-patterned-silicon (GPS) technique for fabrication of GaN-based MEMS", Sensors and Actuators, A 130-131, 2006, pp. 371-378.

* cited by examiner

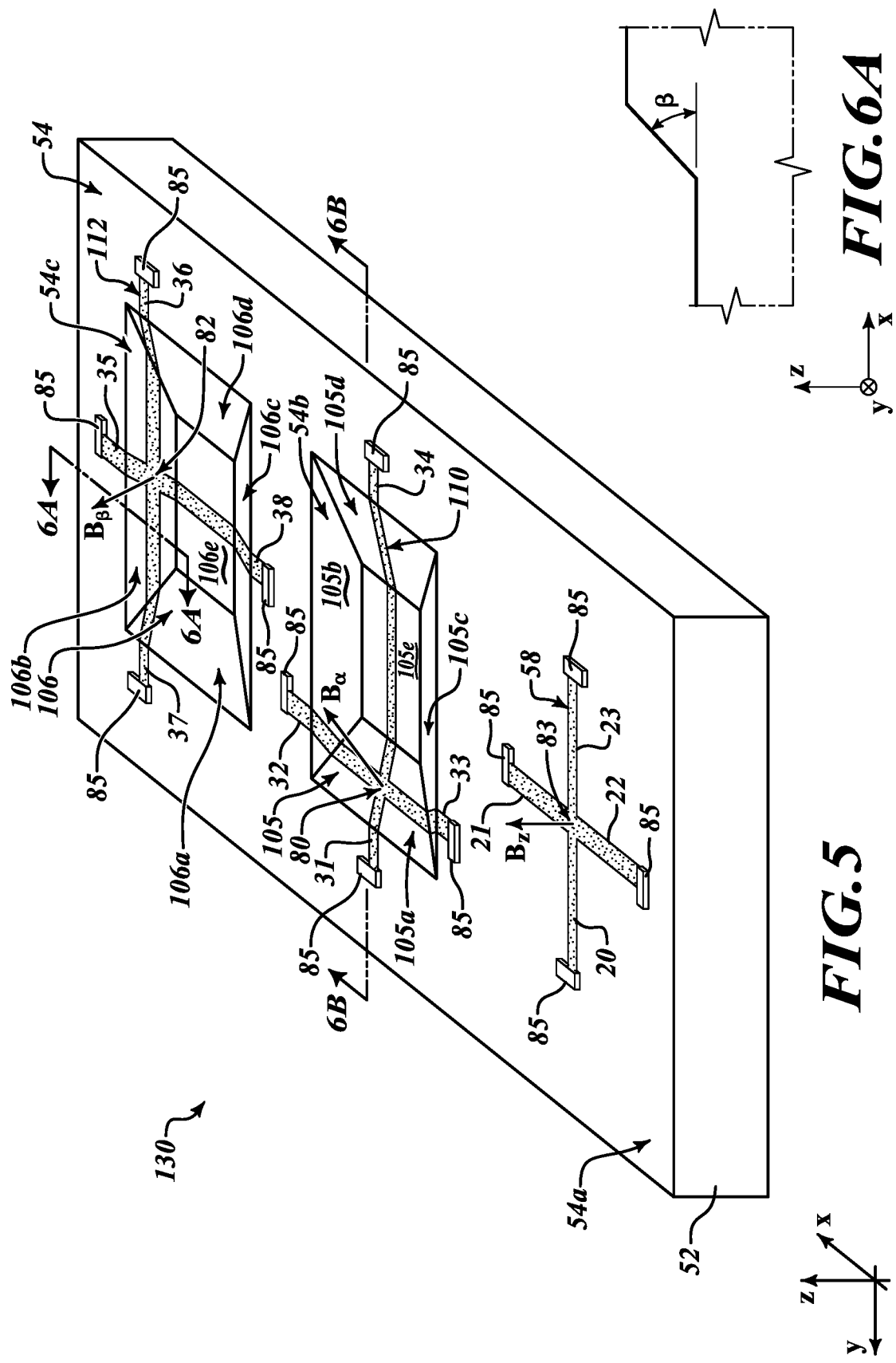

METHOD, DEVICE, AND SYSTEM OF MEASURING EYE CONVERGENCE ANGLE

BACKGROUND

Technical Field

The present disclosure is directed to determining measurement information including depth information of one or more objects in a field of view using an eye-mountable electronic device.

Description of the Related Art

Depth information has become important in many aspects of current technology. Accordingly, there have been numerous efforts in the related industry to read and detect an angle of convergence between two eyes of a human that varies based on the distance between an object within a field of view and the eyes. In doing so, various sensors including microelectromechanical systems (MEMS) sensors have been suggested. These MEMS sensors include, but are not limited to, accelerometers, gyroscopes, tilt sensors, global positioning system (GPS) sensors, and global navigation satellite system (GNSS) sensors. However, such sensors generally consume high power and have been found to be inappropriate to mount on the human eye for a long period (e.g., heating issues in the device due to high power consumption). This issue has prevented the industry from providing a workable commercial product in the marketplace for products such as digital contact lenses, smart contact lenses, head mounted displays (HMD), eye glasses, for example.

The applications of eye convergence angle are unlimited in that it provides accurate depth information (e.g., distance measurement, depth value, or depth map). For example, with accurate depth information, the applications may further extend to augmented reality (AR), virtual reality (VR), environment mapping, computer vision, as well as various other applications.

BRIEF SUMMARY

The present disclosure provides an eye-mountable electronic device or broadly an electronic device that is low in power consumption, cost effective, and is capable of accurately sensing an eye convergence angle by utilizing various sensors, including a magnetometer sensor. The magnetometer sensor according to the present disclosure is capable of reporting angle readings in three dimensions (3D) with very low power profile. The magnetometer sensor or simply magnetometer may be incorporated into a small electronic device that can fit into a human eye, such as a digital contact lens. The device may further adjust the magnetometer to substantially match where the eye is gazing (e.g., horizontal or vertical meridian of the eye, the central focal point of the pupil or the iris), and simultaneously move in conjunction with the eye to follow the change of direction of where the eye is gazing. When the device or the magnetometer of the device is substantially aligned with the gazing direction of the eye, it is possible to detect the gazing direction of the eye (e.g., eye gaze direction vector) as well as the position of the eye in a 3D space. Further, by receiving the gaze direction or the eye position of both eyes in the 3D space, it is possible to obtain the exact or substantially exact angle (e.g., eye convergence angle) of the gaze direction of both eyes with respect to an object within a field of view. By obtaining this eye convergence angle for an object, it is possible to accurately detect depth information as well as other depth related measurements.

The present disclosure also provides an electronic device that incorporates a digital contact lens that can automatically adjust the focal point of an object to provide a human user with clearer vision. Accordingly, the electronic device is capable of performing the traditional function of a contact lens for vision correction. The device may further control the amount of light entering the eye to reduce external light that affects the user's vision.

The present disclosure can also provide an electronic device that has a display that is overlaid on the contact lens portion of the device so that it provides the user with additional information associated with the object that the user is viewing in front of the user's retina.

BRIEF DESCRIPTION OF THE SEVERAL VIEWS OF THE DRAWINGS

Reference will now be made by way of example to the accompanying drawings. In the drawings, identical reference numbers identify similar elements or acts. In some drawings, however, different reference numbers may be used to indicate the same or similar elements. The sizes and relative positions of elements in the drawings are not necessarily drawn to scale. For example, the shapes of various elements and angles are not necessarily drawn to scale, and some of these elements may be enlarged and positioned to improve drawing legibility:

FIG. 5 is a perspective view of an embodiment of the triaxial magnetometer of FIG. 4.

FIG. 6A is a sectional view of a detail of the triaxial magnetometer of FIG. 5, taken along section line 6A-6A;

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with contact lenses have not been shown or described in detail to avoid unnecessarily obscuring descriptions of the embodiments.

Unless the context indicates otherwise, throughout the specification and claims which follow, the word "comprise" and variations thereof, such as, "comprises" and "comprising" are to be construed in an open, inclusive sense that is as "including, but not limited to." Further, the terms "first," "second," and similar indicators of the sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

Figure 1A:
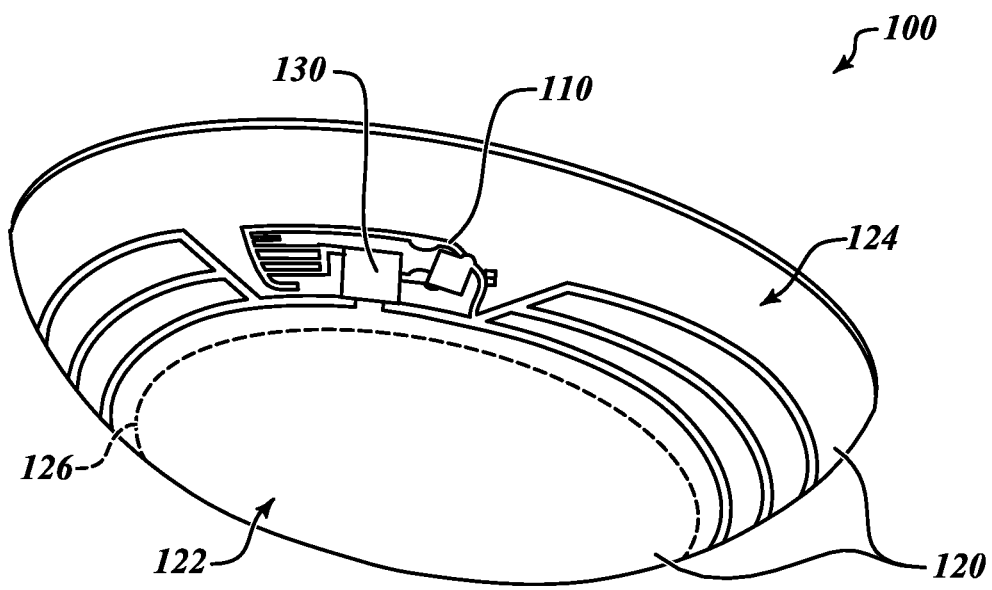
FIG. 1A is a perspective view illustrating an electronic device capable of determining an eye convergence angle using a magnetometer sensor, in accordance with one or more embodiments of the present disclosure.

FIG. 1A is a perspective view illustrating an electronic device 100 capable of determining an eye convergence angle using a magnetometer sensor, in accordance with one or more embodiments of the present disclosure. The electronic device 100 includes an electronic component 110 and a transparent substrate 120. The electronic device, in some embodiments, may be referred to as an eye-mountable electronic device 100 and the transparent substrate 120 may be a contact lens. However, the applications of the electronic component 110 are not limited to mounting just on a contact lens and devices such as HMD, eye glasses or any other electronic devices may also be utilized.

In some embodiments, the electronic component 110 is embedded in the transparent substrate 120 to form the electronic device 100. In other embodiments, the electronic component 110 is mounted on the transparent substrate 120 and is bonded together to the transparent substrate 120 to form the electronic device 100. Further, a fluid made of materials such as a polymeric material (or any other materials suitable to be in contact with an eye) could be injected into the place where the transparent substrate 120 would be formed. The fluid could be later solidified to form the transparent substrate 120. During this process, the electronic component 110 of the electronic device 100 could be formed by disposing the circuitries and components within the injected fluid prior to solidification.

In some embodiments, a substrate used for forming electronic circuitries and components at the electronic component 110 can be made of a pliable material or a relatively rigid material. The pliable materials may include, but are not limited to, silicones, hydrogels, or other flexible materials. The relatively rigid materials may include, but are not limited to, polymethyl methacrylate (PMMA), polyethylene terephthalate (PET), parylene or other suitable materials to support the circuitry and electronic components. However, the manufacturing method of the electronic device 100 as well as the materials for forming the electronic device 100 is not limited to the above and various manufacturing methods and materials may be utilized to form a contact lens having electronic circuitry components.

As shown in the figure, the transparent substrate 120 has an inner circular portion 122 and an outer ring portion 124. In one or more embodiments, the inner circular portion 122 and the outer ring portion 124 of the transparent substrate 120 are integrally formed. However, in other embodiments, the electronic component 110 may be bonded between the inner circular portion 122 and the outer ring portion 124 to form the electronic device 100.

In one or more embodiments, the transparent substrate 120 includes a contact lens (or lens) portion. Further, the transparent substrate 120 may include a display 126 at the inner circular portion 122 to provide the user with additional information associated with the object that the user is viewing. In some embodiments, the display 126 is overlaid on the lens or the contact lens so that it provides visual information data regarding the object in front of the user's retina.

The electronic component 110 where processing circuitries and electronic circuitry components are arranged is located to be spaced apart from a pupil of a human user, during operation, to avoid blocking the view of the user. In some embodiments, the electronic component 110 may be spaced apart from an iris of the user.

The processing circuitries may broadly include any electrical circuitry, microprocessors, microcontrollers, integrated circuits, application-specific integrated circuit (ASIC), chips, microchips, ultra-thin film type chips, for example. The electronic circuitry components may include any electronic or electrical features, components, connections, assembly of electronic components. These may include, but are not limited to, resistors, capacitors, inductors.

It will be appreciated that the processing circuitries or electronic modules listed above may be integrated into a substrate (or a contact lens substrate) or may be located in the vicinity of the contact lens portion. In integrating the processing circuitries, electronic modules in the substrate, a combination of various microfabrication techniques including the use of photoresists, masks, plating techniques, and deposition techniques can be utilized to pattern various materials on the substrate of the electronic device 100.

In further examples, the processing circuitry may be located on a user's mobile device or any other portable or non-portable device so that data processing by the processing circuitries or electronic modules is not necessarily confined to the processor within the electronic device 100.

In one or more embodiments, the electronic component 110 of the electronic device 100 includes a sensor such as a magnetometer 130. The magnetometer 130 enables measuring a magnetic field and is capable of obtaining geomagnetic measurements, directional measurements, positional measurements, for example. The detailed operations of the magnetometer 130 according to the present disclosure will be explained in connection with FIGS. 3, 4, 5, 6A, and 6B. Generally, in order to provide efficient and practical use, the magnetometers have small dimensions (ideally, they can be integrated in a semiconductor material die, for example, for integrated circuits in CMOS—Complementary Metal-Oxide Semiconductor—technology) and, at the same time, provide high sensitivity in the measurement of the magnetic field. In general, magnetometers are considered as having high sensitivity when they enable measuring magnetic fields of the same order as the Earth's magnetic field (generally in the range about 20-70 µT). However, other magnetometers operating under different magnetic field ranges may also be implemented. A magnetometer according to one embodiment utilizes a Hall effect, wherein a difference of potential, referred to as Hall potential, is set up between two different points of a conductive material passed by a current (orthogonal to the Hall potential), in the presence of a magnetic field orthogonal to the electric current and to the Hall potential. In other embodiments, other magnetometers operating based on different principles may also be implemented.

As discussed below, in one embodiment the magnetometer is a 3-axis magnetometer is capable of detecting three-dimensional vectors of the electronic device 100 with respect to a magnetic field, such as the Earth's magnetic field. However, other high-performance magnetometers with more axes may be utilized. For example, a 9-axis magnetometer may also be used. The magnetometer 130 consumes significantly less power compared to other MEMS sensors such as accelerometers and gyroscopes. Due to its low power consumption, the electronic device 100 including the magnetometer 130 is likely to operate longer hours without heating up to the level of affecting the human eye. Further, it will not require frequent recharge of the electronic device 100 for power supply.

In one or more embodiments, the electronic component 110 of the electronic device 100 includes a communication circuit that enables various wireless communication schemes. A determination of an eye convergence angle of the left eye and the right eye of the human user involves communicating sensor data received through the magnetometer of the electronic device 100 from one eye with the electronic device 100 mounted on the other eye. The communication of the sensor data from the magnetometer is transmitted and received via the communication circuit. The communication circuit includes a communication chip or a transceiver that is capable of transmitting and receiving data for processing (e.g., sensor data received from sensors such as magnet sensors, magnetometers). Other suitable processors, microchips or integrated circuitry for performing transmission and reception of data can be used and is not necessarily limited to the above examples.

In some embodiments, the transceiver or communication chip can additionally or alternatively include an antenna for sending and receiving information. Other hardware structures for communication can be readily used and various wireless communication schemes such as, for example, infrared, ZigBee, Ethernet, USB, Bluetooth, Wi-Fi, or near field communication (NFC), or cellular schemes such as CDMA, WiMAX, LTE may be used as well. The detailed operation of determining the vector directions of the magnetic field to identify an eye gaze direction (or an eye gaze direction vector) will be explained hereinafter.

Figure 1B:
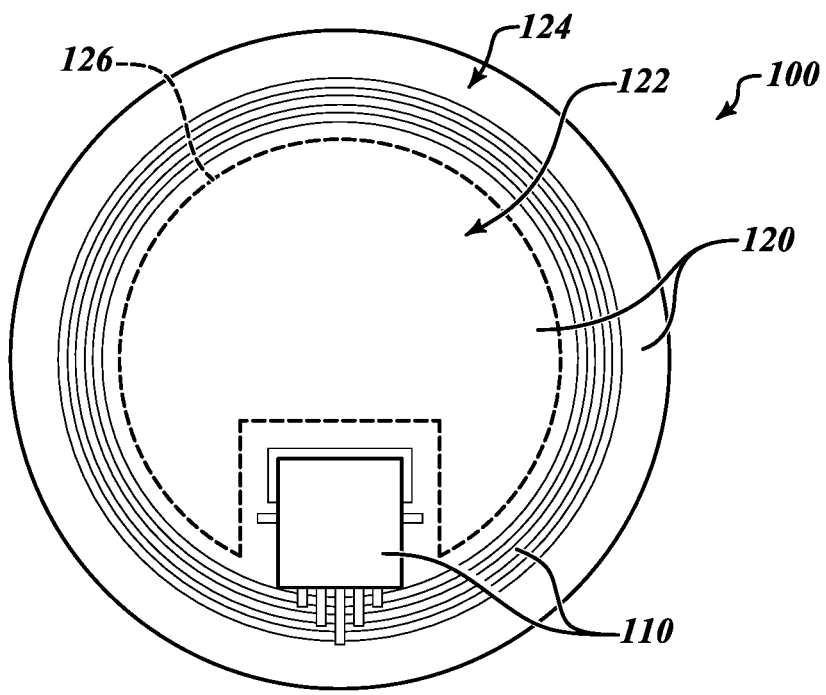
FIG. 1B is a top view illustrating an electronic device having a magnetometer sensor, in accordance with another embodiment of the present disclosure.

FIG. 1B is a top view illustrating an electronic device 100 having a magnetometer sensor (not shown), in accordance with another embodiment of the present disclosure.

As shown, the electronic component 110 may overlap or partially overlap with the inner circular portion 122 of the transparent substrate 120 where the pupil or the iris of the user will be positioned. In FIG. 1A, the electronic component 110 does not overlap with the inner circular portion 122 of the transparent substrate 120 so as not to block the view of a user. However, as shown in FIG. 1B, some parts of electronic components can protrude into an area of the inner circular portion 122 if the processing circuitries and electronic circuitry components are manufactured with transparent materials.

To this end, in one or more embodiments, the electronic device 100 includes substantially transparent conductive materials for forming circuitry, electrodes, interconnects, antennae, and various other components in order not to obstruct the view of the user during operation. The examples of transparent conductive materials may include an indium tin oxide, or a matted network of silver nanowires. However, other substantially transparent conductive materials may be used to implement the electronic circuitries and components.

Figure 2A:
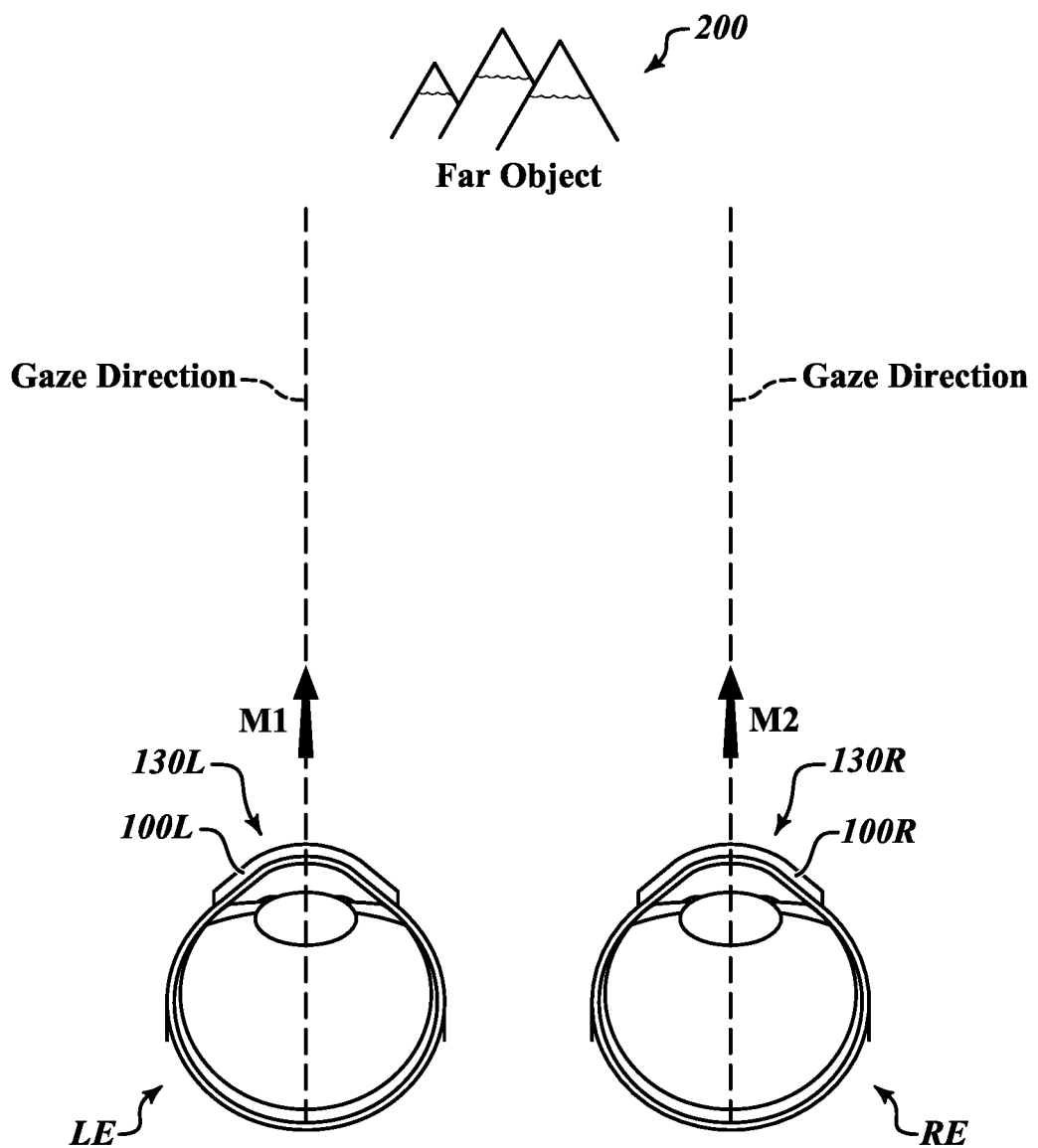
FIG. 2A is a view illustrating a set of electronic devices mounted on a right eye and a left eye, respectively, in which both eyes are gazing toward a remote object.

FIG. 2A is a view illustrating a set of electronic devices 100 respectively mounted on a right eye RE and a left eye LE in which both eyes are gazing toward a faraway object 200.

The electronic device 100, including the magnetometer 130, may be mounted on each eye of the user. Here, an electronic device 100L that includes a magnetometer 130L is mounted on a left eye of the user and an electronic device 100R that includes a magnetometer 130R is mounted on a right eye of the user. The electronic device 100L, 100R are aligned with the left eye and the right eye, respectively, such that the magnetometer 130L, 130R in each eye accurately reflects a gazing direction of the respective eye (e.g., the direction toward which the eye is gazing). In some embodiments, the gazing direction of each eye can be represented with an eye gaze direction vector of each eye and may correspond to a central focal point of the eye (e.g., pupil or iris or other structure of the eye indicative of an eye gazing direction of the user). In other words, each magnetometer 130L, 130R is part of the respective electronic component 110 that is coupled with the transparent substrate 120 which each eye is mounted upon so that the output of the magnetometer 130L, 130R accurately reflects an eye gaze direction vector of the left eye and an eye gaze direction vector of the right eye. Each eye gaze direction vector is an angular vector that represents the gaze direction with respect to the Earth's magnetic pole (the North Pole in the northern hemisphere or the South Pole in the southern hemisphere).

As shown in FIG. 2A, both eyes are gazing toward an object 200 that is within a field of view of both eyes. However, when the object 200 is located significantly far away from the eye, the gazing directions M1, M2 of the left eye LE and the right eye RE will be parallel to each other. Here, the gazing direction M1 of the left eye corresponds to a first eye gaze direction vector. The gazing direction M2 of the right eye corresponds to a second eye gaze direction vector. Accordingly, an angle formed between the gazing directions M1, M2 of the left eye and the right eye will be 0° degree because both vectors are parallel to each other. The angle formed between the left eye gazing direction M1 and the right eye gazing direction M2 may be referred to as "an eye convergence angle" hereinafter.

In one or more embodiments, the first eye gaze direction vector is substantially aligned with the central focal point of the first eye (e.g., left eye) and the second eye gaze direction vector is substantially aligned with the central focal point of the second eye (e.g., right eye). For example, the initial point of the first eye gaze direction vector may start from the central focal point of the eye and the end point of the first eye gaze direction vector may point to the object 200. This may be similar with the second eye gaze direction vector. In other examples, the first eye gaze direction vector may be orthogonal to the intersection of the horizontal and vertical meridian of the first eye (e.g., center of the first eye). Here, the initial point of the first eye gaze direction vector may start from the intersection of the horizontal and vertical meridian of the eye and the end point of the first eye gaze direction vector may point to the object 200.

In this figure where both the first eye gaze direction vector and the second eye gaze direction vector is parallel to each other, both vectors will not converge and form an eye convergence angle of 0° degree.

Absent an additional magnetic field, due to the nature of the magnetometer 130 (which also functions as a digital compass), the default position of the magnetometer 130 will read in the direction of the Earth's magnetic pole. (Similarly, when the human is gazing toward a distant object 200 within the field of view, the magnetometer 130 will also output a gazing direction M1, M2 of the eye (both left and right eye LE, RE) that is parallel and in some cases as gazing toward the direction of the Earth's magnetic pole.

Figure 2B:
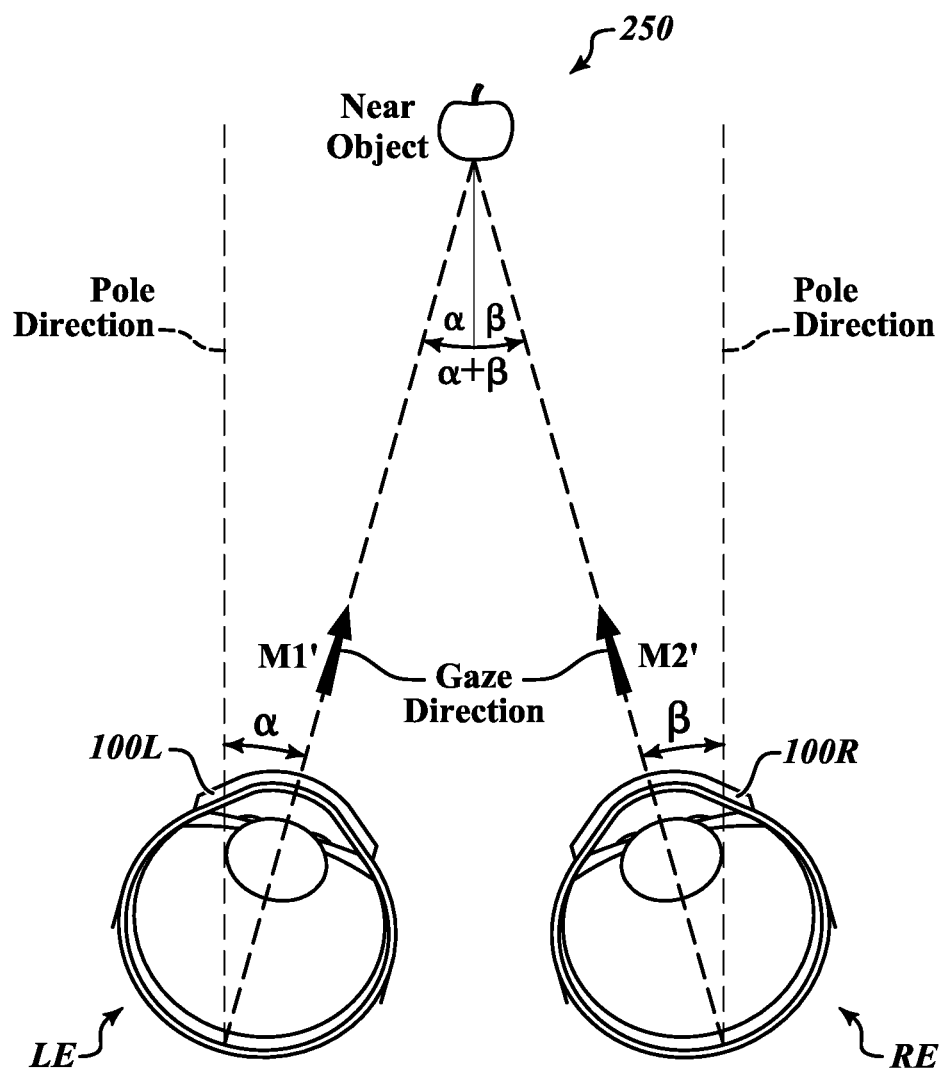
FIG. 2B is a view illustrating the set of electronic devices mounted on the right eye and the left eye, respectively in which both eyes focus on a nearby object.

FIG. 2B is a view illustrating a set of electronic devices 100 respectively mounted on the right eye RE and the left eye LE in which both eyes focus on a nearby object 250.

Figure 2C:
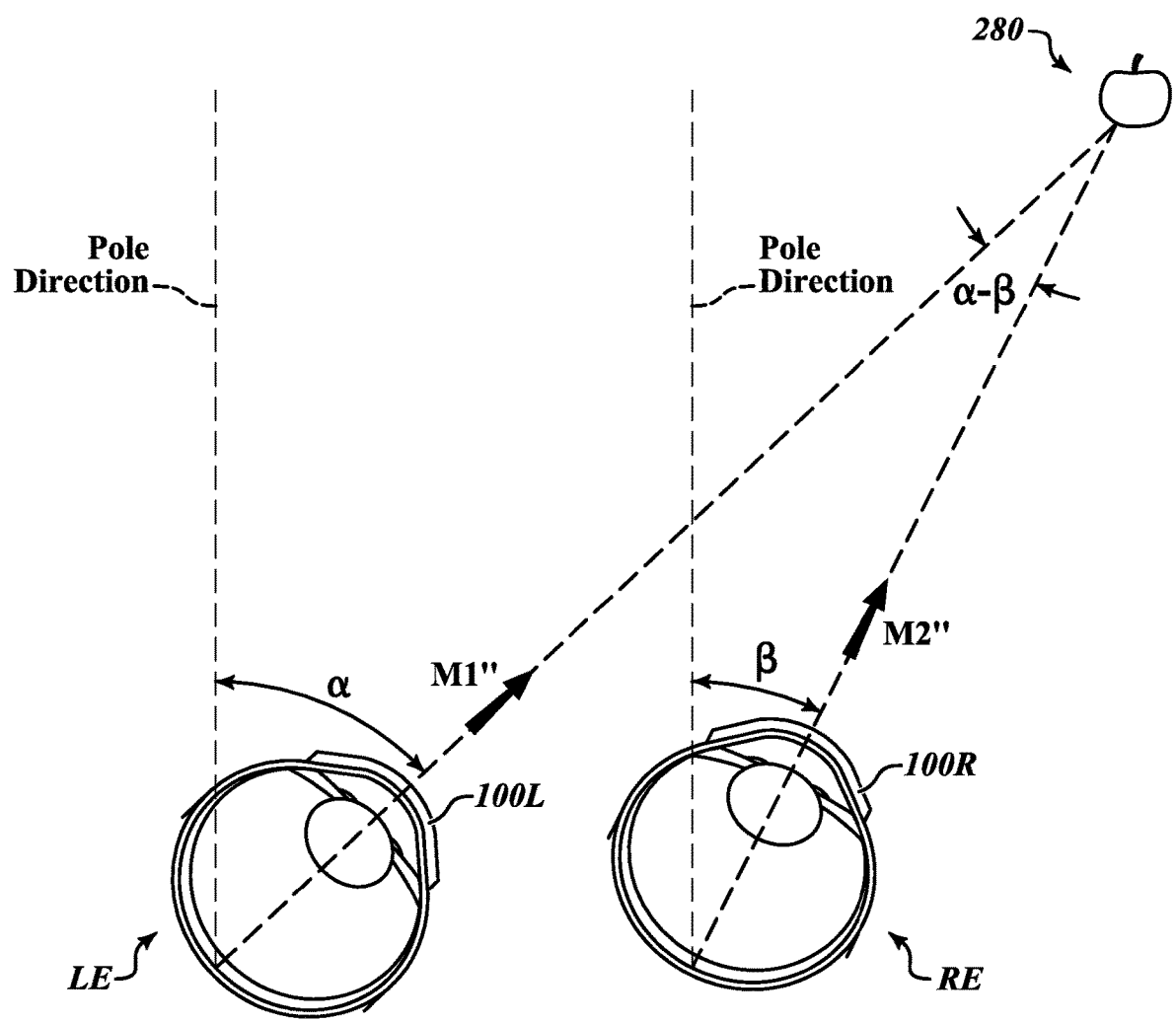
FIG. 2C is a view illustrating the set of electronic devices mounted on the right eye and the left eye, respectively in which both eyes focus on a nearby object at a location to the right.

As shown in FIG. 2B, when both eyes focus on a nearby object 250, the eye convergence angle, which was 0° degree when the eyes were focusing on the distant object 200, converges and forms an angle α+β. For example, when the user focuses on a nearby object 250, the gaze direction of the left eye M1' (which corresponds to an update of the first eye gaze direction vector) tilts and forms an angle α as shown in the figure. Similarly, the gaze direction of the right eye M2' (which corresponds to an update of the second eye gaze direction vector) tilts and forms an angle β. The angles α and β are angles with respect to with respect to the Earth's magnetic pole (or pole direction as shown in FIGS. 2B and 2C). Accordingly, the sum of the angle formed by both the right eye RE and the left eye LE amounts to the eye convergence angle α+β. If both the left eye LE and the right eye RE gaze towards the nearby object 250 that is located along the middle of the left eye LE and the right eye RE, the angle ß will be identical to the angle α. Accordingly, the sum of the angle formed by both the right eye RE and the left eye LE amounts to the eye convergence angle 2α.

In order to obtain the value of the eye convergence angle α+β, each magnetometer 130L, 130R outputs the respective eye gaze direction vector, which includes vector components $B_x$, $B_y$, $B_z$ with respect to the three axes (e.g., X-axis, Y-axis, Z-axis) associated with the magnetometer 130L, 130R, with each vector component being an angular component with respect to the Earth's magnetic pole. Each magnetometer 130L. 130R is positioned to be in synchronization of the movement direction of the eye and aligned in the direction of the central focal point of the eye. In some embodiments, the readings of the magnetometer 130 is indicative of a three dimensional vector coordinate <x, y, z> of the gaze directions M1', M2', respectively, of the left eye and the right eye. That is, each magnetometer 130L, 130R located on the left eye LE or the right eye RE outputs three dimensional vector coordinates. In other embodiments, one or more processors included in the electronic devices 100L, 100R, receives the vector components $B_x$, $B_y$, $B_z$ of the magnetic field B, and translates or calculates them into a 3D vector coordinate <x, y, z>. That is, the electronic device 100L may output a first eye gaze direction vector for the left eye LE and the electronic device 100R may output a second eye gaze direction vector for the right eye RE based on the output of the magnetometer 130.

Referring back to FIG. 2B, after the magnetometers 130L, 130R output the first updated eye gaze direction vector and the second updated eye gaze direction vector based on the nearby object 250, the processor calculates an inner product of the first updated eye gaze direction vector and the second updated eye gaze direction vector to determine the eye convergence angle α+β. For example, if the nearby object 250 is placed exactly halfway between the left eye LE and the right eye RE, angle β will be identical to angle α and the eye convergence angle in this situation will be angle 2α. In other embodiments, an outside processor communicatively connected to the electronic devices 100L, 100R may perform the aforementioned operations of the processor in the electronic devices 100L, 100R. The details and operations of an exemplary 3-axis magnetometer or a triaxial magnetometer are provided in conjunction with FIGS. 3 and 4.

FIG. 2C is a view illustrating a set of electronic devices 100 each mounted on a right eye RE and a left eye LE in which both eyes focus on a nearby object 280 at a different location.

As shown in FIG. 2C, when a nearby object 280 is not located in front of the user's body, the user may still be able to view the object 280 by gazing toward the direction of the nearby object 280 without turning the user's body. In this case, the eye convergence angle α-β degree is obtained based on the angular relationship (e.g., trigonometry) between the gaze direction M1" of the left eye and the gaze direction M2" of the right eye. That is, the gaze direction M1" of the left eye tilts and forms an angle α as shown in the figure. The angle α is an angle of the left eye with respect to the Earth's magnetic pole when the user focuses on a distant object 200 as shown in FIG. 2A. The angle β is an angle of the right eye with respect to the Earth's magnetic pole. Because the object 280 relatively closer from the right eye RE than the left eye LE, the gaze direction of the right eye M2" tilts relatively less compared to the gaze direction of the left eye M1". Accordingly, the eye convergence angle is α-β° by subtracting angle α of the left eye with the angle β of the right eye.

In some embodiments, the processor can determine the eye convergence angle based on the first gaze direction vector (e.g., M1") and the second gaze direction vector (e.g., M2") by obtaining, for example, the inner dot product of the two vectors. The basic principles of the operations of a magnetometer will be explained in FIG. 3, and the method of obtaining a reading of the directions of a magnetic field in a 3D space will be explained in FIGS. 4, 5, 6A, and 6B.

Figure 3:
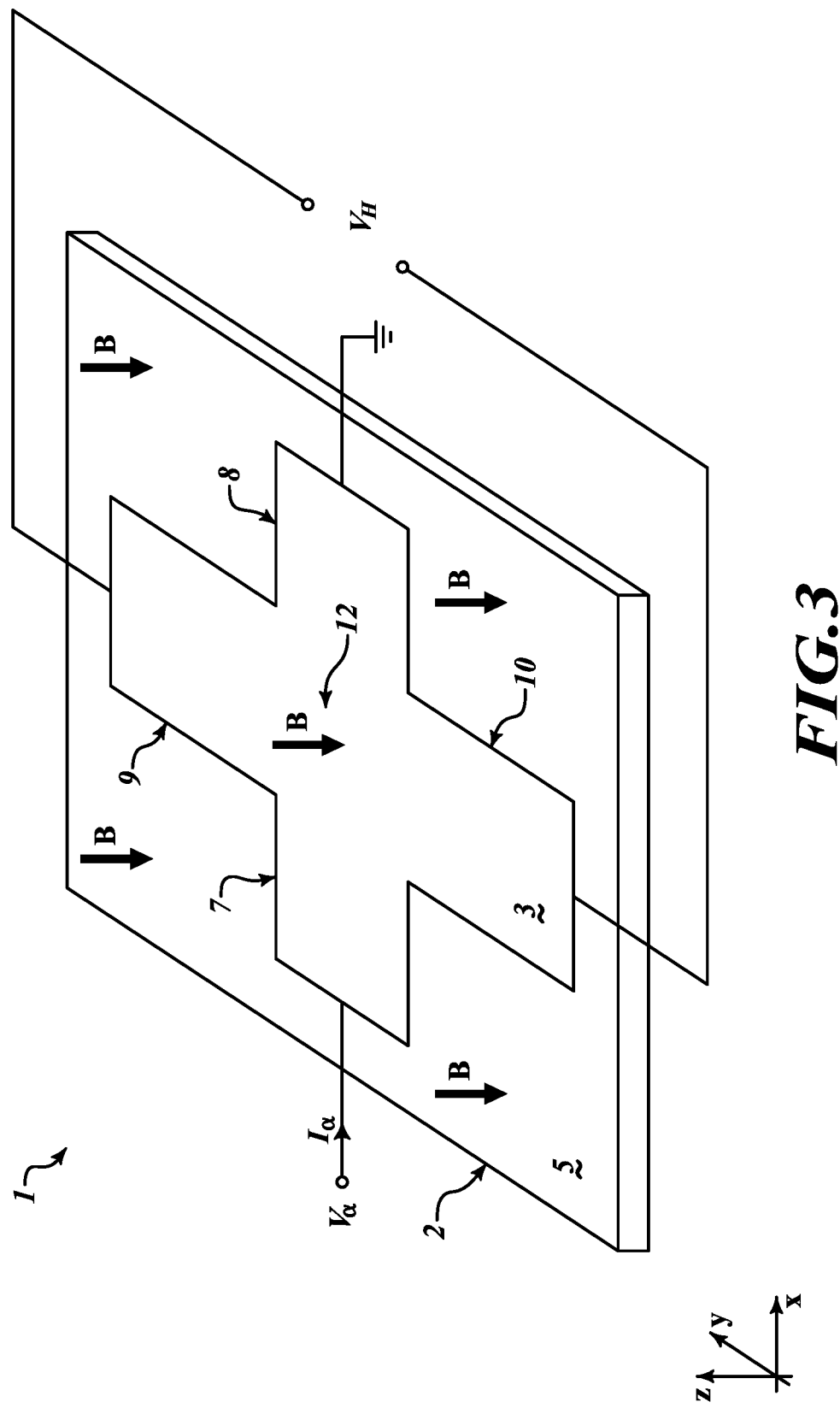
FIG. 3 shows a magnetic sensor, based upon a cross-shaped conductive structure.

FIG. 3 shows a magnetic sensor, based upon a cross-shaped conductive structure. In one embodiment, a Hall-effect magnetic sensor can be used and thus a cross shown in the figure is referred to hereinafter as Hall cross 1, integrated in a die 2 of a semiconductor material such as silicon. However, the single magnetic sensor is not limited to the Hall-effect magnetic sensor and other magnetic sensor implemented based upon different principles can also be used.

In FIG. 3, a Cartesian reference system of mutually orthogonal axes X, Y, Z is used.

The Hall cross 1 comprises a conductive region 3 formed on or in a substrate 5. In some embodiments, the substrate may be formed of a semiconductor material such as silicon that is substantially identical to the materials of the die 2. The conductive region 3 extends in a plane XY defined by axes X and Y, and has four arms 7, 8, 9, 10.

A first arm 7 of the conductive region 3 is electrically connected to a supply source $V_a$, whereas a second arm 8, which is an extension of the first arm 7 in the opposite direction, is electrically connected to a reference potential (for example, 0 V). A third arm 9 and a fourth arm 10, opposite of each other, are orthogonal to the first arm 7 and to the second arm 8. In FIG. 3, the first arm 7 and the second arm 8 are parallel to axis X, and the third arm 9 and the fourth arm 10 are parallel to axis Y. Furthermore, arms 7, 8, 9, 10 meet in a central area 12 of the substrate 5. The Hall potential $V_H$ is measured between mutually opposite ends of the third and fourth arms 9, 10 using a high-impedance measure method in the related art (for example, via an electronic system integrated in the die 2, to carry out a four-point measure).

A supply current $I_a$ flows from the first arm 7 to the second arm 8 along axis X and, in presence of an external magnetic field B along axis Z, the Hall potential $V_H$ is generated along axis Y, as a consequence of the Lorentz force.

To elaborate, charge carriers (for example, electrons) present in the conductive region 3 undergo the Lorentz force $\overline{F}$, which in vector form is expressed as follows:

$$\overline{F} = q\overline{v} \times \overline{B}$$

where q is the charge of an electron, $\overline{v}$ is a vector of the drift velocity of the electron (i.e., the velocity of the electron imposed by the supply current $I_a$), and $\overline{B}$ is a vector indicating the external magnetic field B. Due to the Lorentz force, the simultaneous presence in the Hall cross 1 of the supply current $I_a$ and of the external magnetic field B generates a non-zero component along direction Y in the electron trajectory, and therefore creates a difference of potential between the third and the fourth arms 9, 10 (i.e., the Hall potential $V_H$).

The magnetic sensors currently available on the market, including the Hall cross 1 described above, have a planar structure and thus enable measuring only the spatial component of the magnetic field perpendicular to the laying plane; consequently, they are limited in capability of simultaneously measuring of all the spatial components in the X, Y, and Z directions.

Figure 4:
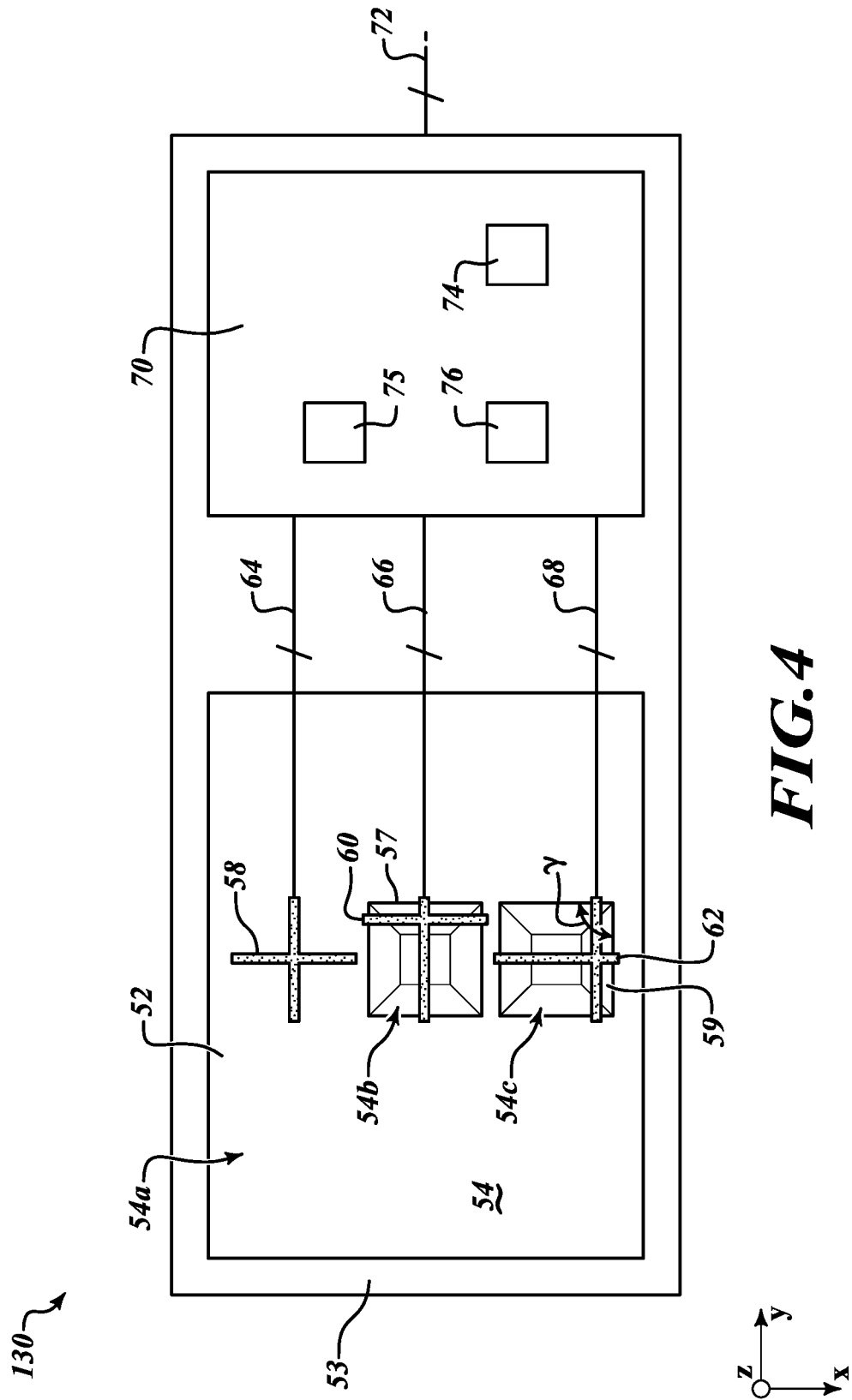
FIG. 4 is a schematic top view of the triaxial magnetometer according to one or more embodiments of the present disclosure.

FIG. 4 is a schematic top view of the triaxial magnetometer 130 according to one or more embodiments of the present disclosure.

With reference to FIG. 4, triaxial magnetometer 130 includes a die 53 integrating a plurality of sensor elements. The die 53 includes a substrate 52 where the substrate is formed of a semiconductor material such as silicon. In some embodiments, the substrate 52 may have a p-type doping and crystallographic orientation (100) so that electronic circuitries can be easily integrated in the die 53. The substrate 52 has a surface 54 having a planar portion 54a, a first non-planar portion 54b, and a second non-planar portion 54c. The non-planar portions 54b, 54c are formed by recesses or by protrusions or reliefs. In some embodiments, the recesses are formed by anisotropic etching of the substrate 52 at the non-planar portions 54b. 54c. The protrusions or reliefs are formed by anisotropic etching the substrate 52 at the planar portion 54a of the surface 54.

In FIG. 4, the first and second non-planar portions 54b, 54c of the surface 54 are pyramidal shaped or frusto-pyramidal shaped (here with a square base, for example, as a result of an anisotropic etching with potassium hydroxide—KOH—on silicon). In addition, in FIG. 4, the first and second non-planar portions 54b, 54c have bases parallel to each other and to axes X, Y. Other configurations are, however, possible.

The planar portion 54a extends in a plane parallel to the plane formed by the X and Y axes (hereinafter also referred to as plane XY). The non-planar portions 54b, 54c each include a first sensing wall 57 and a second sensing wall 59. The first sensing wall 57 is inclined and forms a first inclination angle α (see FIG. 6) with respect to the plane XY. The second sensing wall 59 is inclined and forms a second inclination angle β (FIG. 6A) with respect to the plane XY (and therefore with respect to the planar portion 54a of the surface 54). The first sensing wall 57 and the second sensing wall 59 are not coplanar to each other. Rather, they form an angle of mutual inclination γ (as shown in FIG. 4 on the second non-planar portion 54c). The first inclination angle α, the second inclination angle β, and the mutual inclination angle γ have an amplitude linked to the manufacturing process and to the particular semiconductor material used. Here, for example, the mutual inclination angle γ is about 90°, due to the frusto-conical, square-base shaped of the non-planar portions 54b, 54c and considering a crystallographic orientation (100) of the silicon substrate 52.

In FIG. 4, the triaxial magnetometer 130 includes three Hall-effect magnetic sensors, distinct from each other, and including a first sensor element 58, a second sensor element 60, and a third sensor element 62. The first sensor element 58 (of a planar type) extends, at least partially, parallel to and above the planar portion 54a of the surface 54. The second sensor element 60 (of a non-planar type) lies, at least partially, on the first non-planar region 54b and therefore on the first sensing wall 57, and the third sensor element 62 (of a non-planar type) lies, at least partially, on the second non-planar region 54c and therefore on the second sensing wall 59.

The triaxial magnetometer 130 further includes a control circuit 70, configured to enable a plurality of operating functions. The operating functions include, but are not limited to, setting biasing of the first, second, and third sensor elements 58, 60, 62 (e.g., imposing the supply current $I_a$ of the sensor elements 58, 60, 62); measuring the respective Hall potentials $V_H$ for each sensor elements 58, 60, 62; and processing data (post-processing) in order to obtain respective X, Y, Z components of the magnetic field. To this end, the control circuit 70, integrated in a different portion of the die 53, includes a processing unit 74, for example, a microcontroller or a microprocessor, for data processing. The control circuit 70 further includes a driving circuit 75 for driving the sensor elements 58, 60, 62. The control circuit 70 may further include a supply circuit 76. The first, second, and third sensor elements 58, 60, 62 are electrically connected to the control circuit 70 through a first connection 64, a second connection 66, and a third connection 68, respectively, for setting the biasing and measuring the Hall potentials $V_H$. Each of the first, second, and third connections 64, 66, and 68 may possibly be formed by a plurality of further connections.

The triaxial magnetometer 130 further includes an output connection 72, configured to connect the control circuit 70 to an external apparatus (not illustrated), suitable, for example, for reading and displaying on a screen the measures made by the triaxial magnetometer 130.

In other embodiments, the control circuit 70 can be located outside of the electronic device 100 and may communicate data (e.g., Hall potentials $V_H$, and X, Y, Z components of the magnetic field) through any suitable communication scheme (e.g., Bluetooth, Wi-Fi, cellular system, etc.) incorporated in the electronic device 100.

Moreover, in the triaxial magnetometer 130, the sensor elements 58, 60, 62, that are cross-shaped, include a conductive region formed by a stack of semiconductor materials suitable to form a 2DEG (Two-Dimensional Electron Gas) region. In particular, as described hereinafter, the stack of semiconductor materials includes one or more heterostructures. Materials commonly used to form the heterostructures are gallium and aluminum arsenide (AlGaAs) and gallium arsenide (GaAs), or gallium and aluminum nitride (AlGaN) and gallium nitride (GaN).

Figure 6B:
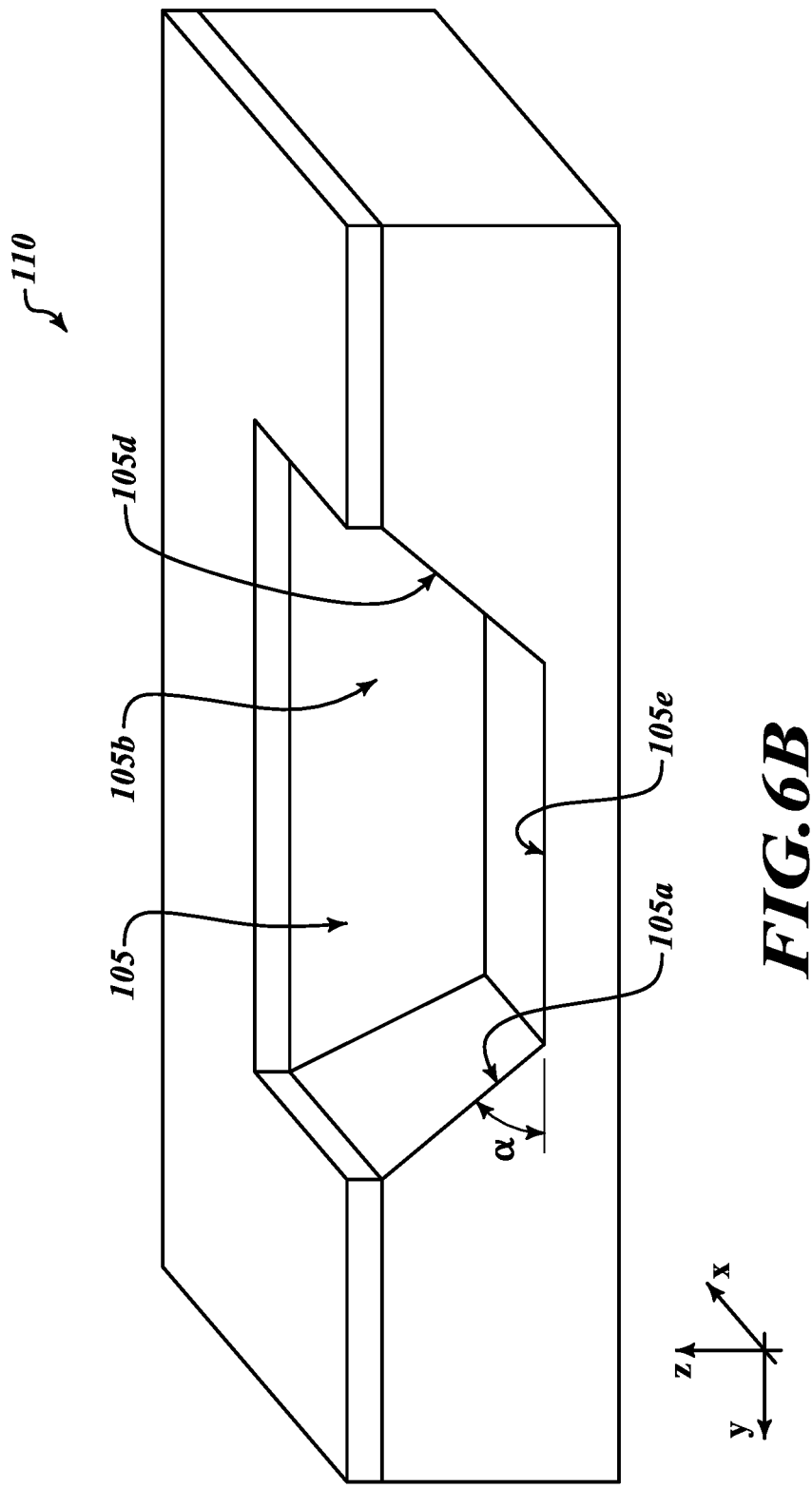
FIG. 6B is a sectional view of a detail of the triaxial magnetometer of FIG. 5, taken along section line 6B-6B.

FIG. 5 is a perspective view of an embodiment of the triaxial magnetometer 130 of FIG. 4. FIG. 6A is a sectional view of a detail of the triaxial magnetometer 130 of FIG. 5, taken along section line 6A-6A. FIG. 6B is a sectional view of a detail of the triaxial magnetometer 130 of FIG. 5, taken along section line 6B-6B.

FIG. 5 shows an embodiment of the triaxial magnetometer 130 where the non-planar regions 54b, 54c are formed by a first recess 105 and a second recess 106 having a frusto-conical shape. In particular, FIG. 5 shows the portion integrating the first sensor element 58, the second sensor element 110, and the third sensor element 112.

The second sensor element 110 (corresponding to the second sensor element 60 of FIG. 4) is non-planar and extends partially in the first recess 105, which has a frusto-pyramidal shape. In detail, the first recess 105 has a first inclined wall 105a, a second inclined wall 105b, a third inclined wall 105c, and a fourth inclined wall 105d, which have a trapezial shape and extend transversely to axes X and Y. The first and fourth inclined walls 105a and 105d are opposite to each other, and the second and third inclined walls 105b, 105c are opposite to each other and are arranged between the first and fourth inclined walls 105a and 105d. The first recess 105 moreover has a base wall 105e. The inclined walls 105a, 105b, 105c, 105d of the first recess 105 are planar walls. Here, the central area 80 of the second sensor element 110 lies on one of the inclined walls 105a, 105b, 105c. 105d, also referred to hereinafter as first sensing wall 105a, corresponding to the first sensing wall 57 of FIG. 4. For instance, the first sensing wall 105a may have a maximum width of approximately 150-300 µm along the axis X.

The second sensor element 110 includes arms 31, 32, 33, 34. A first arm 31 lies in part on the first sensing wall 105a and in part on the planar portion 54a of the surface 54; a second arm 32 lies in part on the first sensing wall 105a, in part on the second inclined wall 105b of the first recess 105, and in part on the planar portion 54a of the surface 54; a third arm 33 lies in part on the first sensing wall 105a, in part on the third inclined wall 105c of the first recess 105, and in part on the planar portion 54a of the surface 54; and a fourth arm 34 lies in part on the first sensing wall 105a, in part on the base wall 105e of the first recess 105, in part on the fourth inclined wall 105d of the first recess 105, and in part on the planar portion 54a of the surface 54.

The third sensor element 112 (corresponding to the third sensor element 62 of FIG. 4) is also non-planar and extends partially in the second recess 106. The second recess 106 here has the same shape and the same spatial orientation as the first recess 105 and has four inclined walls 106a, 106b, 106c, 106d, opposite to each other in pairs, which extend transversely to axes X and Y and here parallel to the homologous inclined walls 105a, 105b, 105c, 105d of the first recess 105. Furthermore, a first inclined wall 106a, a second inclined wall 106b, a third inclined wall 106c, and a fourth inclined wall 106d of the second recess 106 are parallel respectively to the first, the second, the third, and the fourth inclined walls 105a, 105b, 105c, 105d of the first recess 105. The second recess 106 moreover has a base wall 106e.

Here, the central area 82 of the third sensor element 112 lies on the second inclined wall 106b of the second recess 106, also referred to hereinafter as second sensing wall 106b and corresponds to the second sensing wall 59 of FIG. 4.

In FIG. 5, the substrate 52 is of silicon with crystallographic orientation (100), and the first anisotropic etching is carried out via KOH so that the first inclination angle α (see FIG. 6B) is equal to about 54.7°. In some embodiments, the second inclination angle β (see FIG. 6A) is equal to the first inclination angle α.

The third sensor element 112 includes arms 35, 36, 37, 38. A first arm 35 lies in part on the second sensing wall 106b and in part on the planar portion 54a of the surface 54; a second arm 36 lies in part on the second sensing wall 106b, in part on the fourth inclined wall 106d of the second recess 106, and in part on the planar portion 54a of the surface 54; a third arm 37 lies in part on the second sensing wall 106b, in part on the first inclined wall 106a of the second recess 106, and in part on the planar portion 54a of the surface 54; and a fourth arm 38 lies in part on the second sensing wall 106b, in part on the base wall 106e of the second recess 106, in part on the third inclined wall 106c of the second recess 106 and in part on the planar portion 54a of the surface 54.

In addition, FIG. 5 shows contacts 85, for example, of metal, coupled to the end of each arm 20, 21, 22, 23 opposite to the central area 83 of sensor element 58. Similarly, the contacts 85 are coupled to the end of each arm 31, 32, 33, 34 opposite to the central area 80 of the second sensor element 110. Similarly, the contacts 85 are coupled to the end of each arm 35, 36, 37, 38 opposite to the central area 82 of the third sensor element 112. The contacts 85 are configured to electrically connect the respective arms 20-23, 31-34, 35-38 to the control circuit 70 (FIG. 4) and lie on the planar portion 54a of the surface 54. Alternatively, the contacts 85 of each arm 31-34, 35-38, or at least one of them, may lie inside the cavity 105, 106.

In use, the first, second, and third sensor elements 58, 110, 112 are biased so as to cause supply currents $I_a$ (for example, of equal values) to flow along two aligned arms (for example, along the first arm 20, 31, 35 and the fourth arm 23, 34, 38) and the Hall potential $V_H$ is measured on the other two arms (for example, between the contacts 85 of the second arm 21, 32, 36 and the third arm 22, 33, 37). Obviously, the arms to which the supply currents $I_a$ are applied and the arms on which the Hall potential $V_H$ is measured may be exchanged, as clear to the person skilled in the art.

Since a magnetic sensor such as the Hall cross is configured to measure a magnetic field perpendicular to the laying plane of its central area, as a result of the spatial arrangement of the sensor elements 58, 110, 112, here the first sensor element 58 measures a first magnetic field $B_z$ along axis Z (this magnetic field therefore also being referred to hereinafter as third projection $B_z$); the second sensor element 110 measures a second magnetic field $B_\alpha$, having a first component $B_{\alpha,y}$ along the axis Y and a second component $B_{\alpha,z}$ along the axis Z; and the third sensor element 112 measures a third magnetic field $B_\beta$ having a first component $B_{\beta,x}$ along the axis X and a second component $B_{\beta,z}$ along the axis Z.

Through appropriate data-processing operations it is possible to determine the external magnetic field B (e.g., a first projection $B_x$ of the external magnetic field B along axis X, a second projection $B_y$ of the external magnetic field B along axis Y, and the third projection $B_z$), starting from the measured values of the first magnetic field $B_z$, second magnetic field $B_\alpha$, and third magnetic field $B_\beta$.

In particular, the control circuit 70 is configured to calculate, starting from the Hall potentials $V_H$ measured by the first, second, and third sensor elements 58, 110, 112, the values of the first magnetic field $B_z$, second magnetic field Ba, and third magnetic field $B_\beta$, respectively, according to various known techniques (for example, by a linear relation between a Hall potential and a respective component of the magnetic field), and is moreover configured to calculate the first projection $B_x$ and the second projection $B_y$ of the external magnetic field B.

In particular, the first projection $B_x$, the second projection $B_y$, and the third projection $B_z$ are obtained, for example, using the following three equations below:

$$B_x = B_z \cdot \tan(\alpha) - B_\alpha \cdot \sin(\alpha)$$

$$B_y = B_x \cdot \tan(\alpha) - B_\beta \cdot \sin(\alpha)$$

$$B_z = B_z$$

The above three projections in the Cartesian system thus define uniquely the external magnetic field B.

If the first and second recesses 105, 106 have walls perpendicular to the planar portion 54a of the surface 54 (i.e., when the first and second inclination angles $\alpha$, $\beta$ are equal to about 90°), the control circuit 70 directly calculates the projections $B_x$, $B_y$, and $B_z$ from the measured Hall potentials $V_H$.

According to a further embodiment of the present disclosure, the system includes more than three Hall-effect sensors not coplanar to each other. As mentioned previously, a multi-axes magnetometer such as a 9-axis magnetometer may also be utilized to improve accuracy of the detection. Calculation of the value of the external magnetic field can further be obtained by various other methods known to the person skilled in the art. For example, the least-squares method may be used. Further, choosing three available measures obtained from the sensor elements of the triaxial sensor and using them to solve a three equation system as set forth above can be used.

Returning to FIG. 2B, once the X, Y, Z components of the magnetic field $B_x$, $B_y$, $B_z$ are obtained, the control circuit 70 translates the values into a X, Y, Z vector components in a three dimensional space. Based on the magnetometer 130 readings for the right eye RE and the left eye LE which the control circuit 70 translates into (X, Y, Z) vector components, the eye convergence angle for both eyes can be determined.

An exemplary method of determining the eye convergence angle by using the vector coordinates of the gazing directions of the left eye and the right eye is provided. For example, if the control circuit 70 outputs a vector coordinate of the gazing direction of the left eye as <−207, −325, −510> based on the readings of the magnetometer $M_1$ in the left eye, and if it outputs a vector coordinate of the gazing direction of the right eye as <−94, −163, −523> based on the readings of the magnetometer $M_2$ in the right eye, the eye convergence angle $2\alpha$ can be determined based on the following formulas (1) and (2):

$$\cos\theta = \frac{a \cdot b}{|a| \cdot |b|} = \frac{a_1 b_1 + a_2 b_2 + a_3 b_3}{\sqrt{a_1^2 + a_2^2 + a_3^2} \sqrt{b_1^2 + b_2^2 + b_3^2}} \quad (1)$$

wherein, vector $a=$<a1,a2,a3>; vector $b=$<b1,b2, b3>; $\theta=\alpha+\beta$ \quad (2)

Based on the above dot product formula, $M_1 \cdot M_2 = |M_1| \cdot |M_2| \cos(\alpha+\beta)$ is calculated as follows:

$$M_1 \cdot M_2 = 207 \times -94 + -325 \times -163 + -510 \times -523 = 339163$$

$$|M_1| = \sqrt{(207 \times 207 + 325 \times 325 + 510 \times 510)} = \sqrt{408574}$$

$$|M_2| = \sqrt{(94 \times 94 + 163 \times 163 + 523 \times 523)} = \sqrt{308934}.$$

Accordingly, $\cos(\alpha+\beta) = 339163/(\sqrt{408574} \times \sqrt{308934}) = 0.954641$.

Hence, eye convergence angle $\alpha+\beta$ is about 18.2° (degrees).

The same calculation method may be applied with respect to the embodiment shown in FIG. 2C.

The determination of the eye convergence angle for an object allows obtaining accurate depth information which can be utilized in the field of VR and AR applications. In one or more embodiments, the depth information used herein is broadly used to encompass information related to obtaining distance measurements, depth measurements, and any other suitable measurements in calculating distance or depth of an object within a field of view of the electronic device 100.

Figure 7:
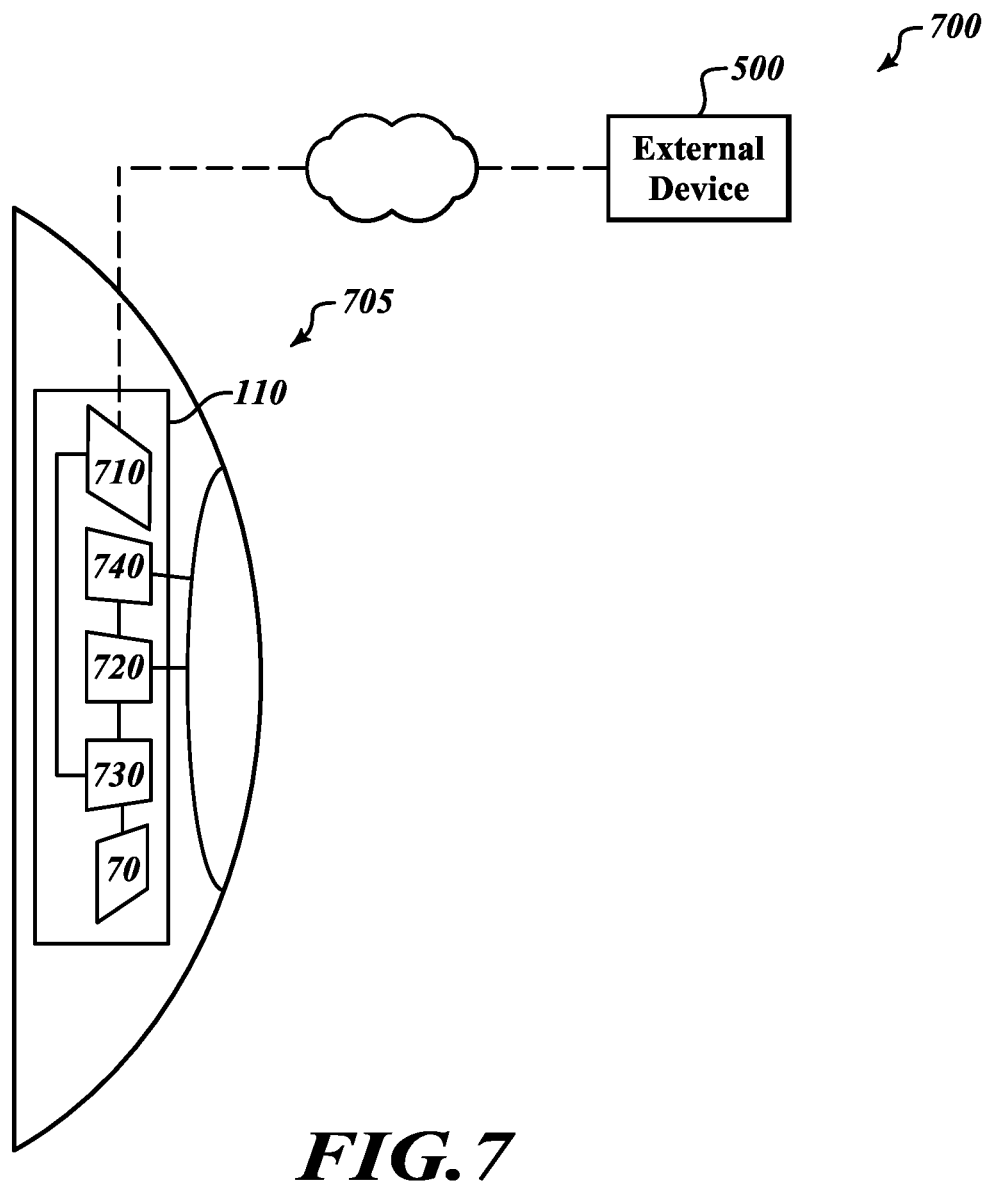
FIG. 7 is a diagram of a system that includes an electronic device interfacing with an external device based on various wireless communication schemes.

FIG. 7 is a block diagram of a system 700 that includes an electronic device 705 interfacing with an external device 500 based on various wireless communication schemes. In one or more embodiments, the electronic device 705 having an electronic component 110 includes a control circuit 70, a communication circuit 710, a sensor module 720, a power supply module 730, and a curvature controller 740. The power supply module 730 supplies operating voltages to the control circuit 70, the communication circuit 710, the sensor module 720, the curvature controller 740, and other components (not shown) within the electronic device 100.

In one or more embodiments, the control circuit 70, which may include one or more processors, is configured to perform and execute the various operations explained throughout the present disclosure.

However, in other embodiments, a processor in an external device 500 may perform and execute the various operations explained throughout the present disclosure. In these embodiments, to reduce or minimize the size of the electronic device 100, the control circuit 70 may not be included in the electronic device 100. For example, the processors are located outside of the electronic device 100 and the communication circuit 710 may relay the data information collected from the sensor module 720 to an external device 500 for processing. In these cases, the power supply module 730 will not consume as much power as those cases where the processor is present within the electronic device 100. The external device 500 may be, for example, a server, portable computing device, a mobile smart phone, smart watch, tablet PC, laptop computer, PC. Other examples of external devices having processing capabilities may be included.

In transmitting and receiving data for processing (e.g., sensor data received from sensors such as magnetometers), a communication circuit 710 communicates signals having information and data via a communication medium (e.g., network, cloud, etc.) to and from an external device 500. Various wireless communication schemes such as, for example, infrared, ZigBee, Ethernet, USB, Bluetooth, Wi-Fi, or near field communication (NFC), or cellular schemes such as CDMA, WiMAX, LTE may be used.

In some embodiments, the communication circuit 710 uses an antenna for sending and receiving information. The communication circuit 710 can optionally include one or more oscillators, encoders, decoders, amplifiers, filters, mixers, frequency injectors to modulate or demodulate information on a carrier frequency to be transmitted or received by the antenna. The antenna is operated by the control circuit 70 to communicate information to and from the electronic device 100 and the external device 500.

The sensor module 720 may include a variety of orientation sensors such as a digital compass, gyroscope, an accelerometer, a magnetometer, magnetic sensors, tilt sensors or other sensors that may be used to determine the direction of the user's gaze. However, in some embodiments according to the present disclosure, only a magnetometer may be used to lower the power consumption rate within the electronic device 100 as incorporating various types of sensors (e.g., gyroscopes, accelerometers, etc.) within the electronic device 100 may heat up the device quicker than using a magnetometer.

In some embodiments, the electronic device 100 can include other components such as a memory to store the data information collected from the sensor module 720. For example, the sensor module 720 collects the measurements of the magnetic field $B_x$, $B_y$, $B_z$ from the magnetometer and stores them in the memory. The data stored in the memory may be easily accessible and retrievable by one or more processors of the control circuit 70 for data processing. The memory is a non-transitory computer-readable medium that can include, without limitation, magnetic disks, optical disks, organic memory, or any other volatile (e.g. RAM) or non-volatile (e.g. ROM) storage system readable by the processor. The memory can include a data storage to store indications of data, such as sensor readings (e.g., related to the magnetometer), parameters, algorithms, executable program instructions, and other settings, for example.

In other embodiments, the control circuit 70 may receive the data from the sensor module 720 without transiently storing it in a memory and perform the calculation and subsequently output the eye convergence angle based on the eye gaze direction vector readings.

In one or more embodiments, the electronic device 100 includes a display in the contact lens portion so that information related to the object, in the form of annotations, images or video may be superimposed onto the real world view of the user. The information is superimposed with respect to the user's gaze direction. Any information obtained related to the object can be processed and may be overlaid onto a display embedded into the lens substrate so that visual information is displayed in front of the user's retina.

In one or more embodiments, the curvature controller 740 is coupled to the sensor module 720 for adjusting the curvature of the contact lens based on the eye convergence angle. For example, the curvature controller 740 is connected to the magnetometer 130 and the processors in the control circuit 70 to provide an adjustment signal to the curvature controller 740 to adjust the curvature of the contact lens and thereby adjust the focal point of the lens and eye. The control circuit 70, in operation, determines the center of the first eye and the second eye by information collected from the sensor module 720. In some embodiments, the sensor module 720 includes an image sensor for capturing one or more images of an eye to calculate the horizontal and vertical meridian of the eye. The processor within the control circuit 70 can determine a focal point of the eye based on the inputs from the sensor module 720 and then calculate a positional difference between the focal point and the center of each corresponding eye and determine whether the positional difference is within an acceptable marginal range indicative of substantial alignment of the center and the focal point of each eye. If the positional difference is not within the marginal range, the processor provides, for example, to a user through display 126 adjustment signals to adjust the position of the magnetometer to compensate for the positional difference to substantially correspond the focal point of each eye to the center of each eye.

In other embodiments, the finding of the center of the eye and the focal point of the eye may be performed by using a magnetometer 130. After mounting the electronic device 100 by the user, there may be cases where the eye of the user is not exactly aligned with the magnetometer in the device. The user may view a distant object in any direction or view towards, for example, the North Pole, to align the vision of the eye and the direction of the magnetometer. The curvature controller may lock this position and the control circuit 70 can confirm that this alignment position aligns the vision of the user's eye and the direction of the magnetometer (e.g., eye gaze direction vector). The electronic device 100 may then move in synchronization with the movement of the eye so that the readings of the magnetometer accurately reflect the eye gaze direction vector.

The power supply module 730 provides power for the control circuit 70, the communication circuit 710, the sensor module 720, the curvature controller 740, and other components such as display, memory, and other components within the electronic device 100. In some embodiments, the power supply module 730 is configured to provide power from a rechargeable battery such as a flexible, thin-film, or solid-state battery. In other embodiments, the power supply module 730 may have components to store kinetic energy and recharge the battery with electrical energy when the eye rotates or vibrates during eye motion.

It is noted that the block diagram shown in FIG. 7 is described in connection with functional modules for convenience in the description. However, embodiments of the electronic device 100 can be arranged with one or more of the functional modules (such as "sub-systems") implemented in a single chip, integrated circuit to manufacture a small-sized device for mounting in the user's eye. Some of the functions of the modules, unit, or circuits can be implemented as separated structures implemented by separately packaged chips electrically connected to one another or can be incorporated as a single module to reduce the overall size of the electronic device 100.

Figure 8:
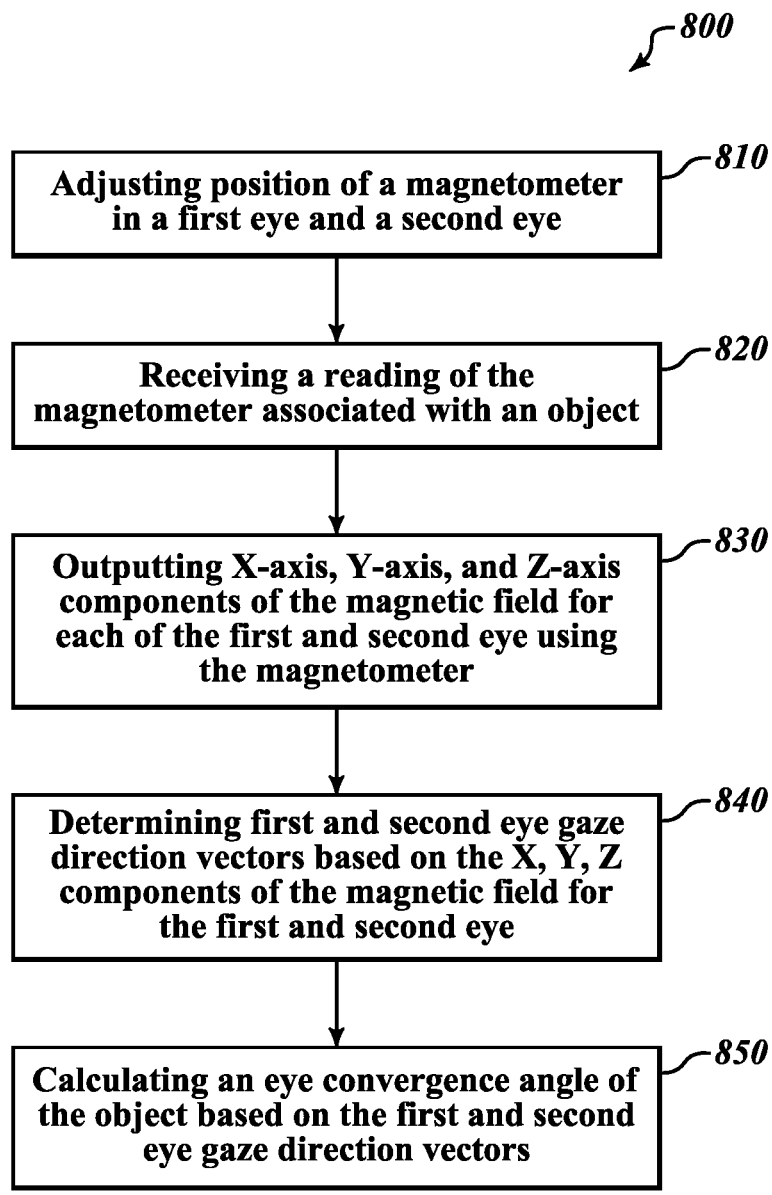
FIG. 8 is a flowchart of a method according to one or more embodiments of the present disclosure.

FIG. 8 is a flowchart of a method 800 according to one or more embodiments of the present disclosure.

The process starts at step 810, for example, by adjusting the position of a magnet sensor such as the magnetometer 130 within the electronic devices 100 respectively on a first eye and a second eye of a user. A user may mount the electronic device 100 over each eye. Once the electronic device 100 is correctly mounted to align the central focal point of the first eye and the second eye with each magnetometer 130, the readings of the magnetometer 130 can accurately reflect the central focal point of the first eye and the second eye.

In this step, one or more processors within the electronic device 100 determine the center of the first eye and the second eye. In some embodiments, the center of the eye may correspond to the horizontal and vertical meridian of the eye. Based on a sensor located in the inner circular portion of the contact lens portion 120, the sensor captures the shape of the eye and the one or more processors determine the center by virtually drawing a horizontal meridian and a vertical meridian and outputting the intersecting point of the horizontal and vertical meridian of the eye.

A lens in the inner circular portion of the contact lens portion 120 in corroboration with the processor determines a focal point of first eye and the second eye. The processor then calculates a positional difference between the focal point of an eye and the center of the corresponding eye. The processor calculates whether the positional difference is within an acceptable marginal range that is indicative of substantial alignment of the center and the focal point of each eye. The acceptable marginal range may be any numerical range that is considered a margin of error between the difference of the center and the focal point of each eye. For example, if the difference that is within a marginal range produces an accurate reflection of the focal point of each eye, this difference would still be considered as an acceptable difference within the acceptable marginal range.

The lens and the magnetometer 130 which is physically or electronically coupled to a curvature controller can adjust the movement of the magnetometer 130 and automatically compensate for the positional difference to substantially correspond the focal point of each eye to the center of each eye if the obtained difference is outside the acceptable marginal range.

Once the position of the magnetometer 130 is adjusted, the curvature controller adjusts the direction of the magnetometer 130 moves in synchronization with the eye movement of the user. This operation between the curvature controller and the magnetometer 130 ensures that the readings of the magnetometer 130 accurately reflect whatever direction the eye is gazing towards.

At step 820, the electronic device 100 receives an image of an object within a field of view overlapping the first and second eye using the lens.

At step 830, the magnetometer 130, which is a triaxial magnetometer in some embodiments, outputs X-axis, Y-axis, and Z-axis components of the magnetic field for each of the first and second eye upon viewing the object.

At step 840, the processor determines a first eye gaze direction vector for a first eye and a second eye gaze direction vector for a second eye based on the X, Y, Z components of the magnetic field. As explained in connection with FIGS. 2A, 2B, and 2C, the first eye gaze direction vector and the second eye gaze direction vector is substantially aligned with the central focal point of the eye.

At step 850, the processor calculates an eye convergence angle of the object based on the first and second eye gaze direction vectors. When the right eye and the left eye is both gazing at the same object, the first eye gaze direction vector and the second eye gaze direction vector will converge and form an eye convergence angle.

In this step, the processor first calculates an inner product of the first and second eye gaze direction vectors. The processor calculates a first absolute value of the first eye gaze direction vector and a second absolute value of the second eye gaze direction vector. The eye convergence angle is calculated based on the inner product, the first absolute value, and the second absolute value by dividing the inner product with the product of the first and second absolute value. The details of the calculation process of these vectors are explained in connection with FIGS. 2B and 2C.

Additional aspects of the method according to the present disclosure is disclosed. For example, in one aspect of a method according to the present disclosure, the method includes a step for positioning first and second triaxial magnetometers respectfully in front of a first eye and a second eye to synchronize a respective movements of the triaxial magnetometers with respective movements of a center of the first eye and a center of the second eye. A first and second eye gaze direction vectors are perpendicular to the center of the first and second eye, respectively.

The method also includes a step for each triaxial magnetometer detecting a direction of a magnetic field from the triaxial magnetometer to an object within a field of view of the first and second eyes. The triaxial magnetometer has X-axis, Y-axis, and Z-axis components, where the X-axis, Y-axis, and Z-axis are orthogonal to each other.

The method further includes a step for determining the first and second eye gaze direction vectors based on the X-axis, Y-axis, Z-axis components detected by the first and second magnetometers for the first and second eyes, respectively.

The method additionally includes a step for calculating an eye convergence angle of the object based on the first and second eye gaze direction vectors.

In one or more embodiments, the step for calculating the eye convergence angle of the object includes: calculating an inner product of the first and second eye gaze direction vectors; calculating a first absolute value of the first eye gaze direction vector; calculating a second absolute value of the second eye gaze direction vector; and calculating the eye convergence angle based on the inner product, the first absolute value, and the second absolute value.

In one or more embodiments, the step for positioning the first and second triaxial magnetometers includes: determining the centers of the first eye and the second eye; determining a focal point of first eye and a focal point of the second eye; calculating a first positional difference between the focal point and the center of the first eye and a second positional difference between the focal point and the center of the second eye; and determining whether each of the first and second positional differences is within an acceptable marginal range indicative of substantial alignment of the center and the focal point of the respective eye.

In one or more embodiments, the first and second triaxial magnetometers are parts of first and second electronic devices. The step for positioning the first triaxial magnetometer further includes: automatically moving the first triaxial magnetometer within the first electronic device to compensate for the first positional difference and substantially correspond the focal point of each first eye to the center of the first eye; and automatically moving the second triaxial magnetometer within the second electronic device to compensate for the second positional difference and substantially correspond the focal point of the second eye to the center of the second eye.

In one or more embodiments, for each of the first and second eyes, the center of the eye corresponds to a horizontal and vertical meridian of the eye.

In another aspect of a method according to the present disclosure, the method includes: receiving a first eye gaze direction vector for a first eye and a second eye gaze direction vector for a second eye using a triaxial magnetometer included in an eye-mountable electronic device, the eye-mountable electronic device being mounted on each of the first eye and the second eye, the first and second eye gaze direction vectors being orthogonal to both a horizontal and vertical meridian of each eye; receiving a first object within a field of view of each eye using the eye-mountable electronic device, the first object being sufficiently distant to provide the first eye gaze direction vector and the second eye gaze direction vector to be substantially parallel to each other; receiving a second object within the field of view of each eye using the eye-mountable electronic device that is closer in distance than the first object; detecting an update of value in the first and second eye gaze direction vectors with respect to the second object within a predetermined time using the triaxial magnetometer; outputting the first updated eye gaze direction vector and the second updated eye gaze direction vector using the triaxial magnetometer; calculating an inner product of the first updated eye gaze direction vector and the second updated eye gaze direction vector using a processor included in the eye-mountable electronic device; and outputting an angle formed based on the first updated eye gaze direction vector and the second updated eye gaze direction vector with respect to the second object.

The various embodiments described above can be combined to provide further embodiments. Further changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a first device configured to be placed on a first eye, the first device including a first magnetometer configured to generate a first magnetic field measurement;
a second device configured to be placed on a second eye, the second device including a second magnetometer configured to generate a second magnetic field measurement; and
a processor configured to:
determine a first eye gaze direction vector based on the first magnetic field measurement;
determine a second eye gaze direction vector based on the second magnetic field measurement; and
determine an inner product of the first eye gaze direction vector and the second eye gaze direction vector; and
determine an eye convergence angle of an object based on the inner product, the first eye gaze direction vector, and the second eye gaze direction vector.

2. The system of claim 1 wherein each of the first magnetic field measurement and the second magnetic field measurement include components along first, second, and third axes.

3. The system of claim 1 wherein the first device includes the processor.

4. The system of claim 1 wherein the processor is external to the first device and the second device.

5. The system of claim 1 wherein the first device includes a first transparent substrate, the second device includes a second transparent substrate, and the first and second magnetometers are on the first and second transparent substrates, respectively.

6. The system of claim 1 wherein the first and second eye gaze direction vectors extend from centers of the first and second eyes, respectively.

7. A method, comprising:
generating, by a first magnetometer included in a first device, a first magnetic field measurement, the first device configured to be placed on a first eye;
generating, by a second magnetometer included in a second device, a second magnetic field measurement, the second device configured to be placed on a second eye; and
determining, by a processor, a first eye gaze direction vector based on the first magnetic field measurement;
determining, by the processor, a second eye gaze direction vector based on the second magnetic field measurement;
determining an inner product of the first eye gaze direction vector and the second eye gaze direction vector; and
determining, by the processor, an eye convergence angle of an object based on the inner product, the first eye gaze direction vector, and the second eye gaze direction vector.

8. The method of claim 7 wherein each of the first magnetic field measurement and the second magnetic field measurement include components along first, second, and third axes.

9. The method of claim 7 wherein the first device includes the processor.

10. The method of claim 7 wherein the processor is external to the first device and the second device.

11. The method of claim 7 wherein the first device includes a first transparent substrate, the second device includes a second transparent substrate, and the first and second magnetometers are on the first and second transparent substrates, respectively.

12. The method of claim 7 wherein the first and second eye gaze direction vectors extend from centers of the first and second eyes, respectively.

13. A first device, comprising:
a first magnetic sensor configured to generate a first magnetic field measurement; and
a communication circuit configured to receive, from a second device, a second magnetic field measurement, the first and second devices configured to be mounted on first and second eyes, respectively; and
a processor configured to:
determine a first eye gaze direction vector based on the first magnetic field measurement;
determine a second eye gaze direction vector based on the second magnetic field measurement; and
determine an inner product of the first eye gaze direction vector and the second eye gaze direction vector; and
determine an eye convergence angle of an object based on the inner product, the first eye gaze direction vector, and the second eye gaze direction vector.

14. The first device of claim 13 wherein each of the first magnetic field measurement and the second magnetic field measurement include components along first, second, and third axes.

15. The first device of claim 13 wherein the first device includes a transparent substrate, and the first magnetic sensor and the processor are on the transparent substrate.

16. The first device of claim 15 wherein the transparent substrate is a contact lens.

17. The first device of claim 13 wherein the first and second eye gaze direction vectors extend from centers of the first and second eyes, respectively.

* * * * *